United States Patent
Chiang et al.

(10) Patent No.: US 6,808,323 B2
(45) Date of Patent: Oct. 26, 2004

(54) PASSIVE ALIGNMENT PACKAGING STRUCTURE FOR OPTO-ELECTRICAL DEVICES AND OPTIC FIBER CONNECTORS

(75) Inventors: Shin-Terng Chiang, Hsinchu (TW); Chun-Kai Liu, Taipei (TW); Yu-Kon Chou, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 108 days.

(21) Appl. No.: 10/365,424

(22) Filed: Feb. 13, 2003

(65) Prior Publication Data

US 2003/0161591 A1 Aug. 28, 2003

(30) Foreign Application Priority Data

Feb. 26, 2002 (TW) ........................... 91202247 U

(51) Int. Cl.[7] ................................. G02B 6/36
(52) U.S. Cl. ..................... 385/93; 385/33; 385/52
(58) Field of Search ..................... 385/33, 52, 88–94

(56) References Cited

U.S. PATENT DOCUMENTS

| | | | | |
|---|---|---|---|---|
| 5,337,398 A | * | 8/1994 | Benzoni et al. | 385/90 |
| 5,499,312 A | | 3/1996 | Hahn et al. | 385/91 |
| 5,905,831 A | | 5/1999 | Boudreau et al. | 385/88 |
| 6,741,778 B1 | * | 5/2004 | Chan et al. | 385/52 |
| 2003/0210873 A1 | * | 11/2003 | Moretti | 385/89 |

* cited by examiner

Primary Examiner—Phan T. H. Palmer
(74) Attorney, Agent, or Firm—Birch, Stewart, Kolasch & Birch, LLP

(57) ABSTRACT

A passive alignment packaging structure for opto-electrical devices and optic fiber connectors provides a passive alignment packaging structure for opto-electrical devices and optic fiber connectors. The passive alignment packaging is of great benefit to automatic assembly in lowering the manufacturing cost and satisfying the requirement of a precisely aligned optical path. The invention connects the silicon substrate for installing an opto-electrical device to a leadframe by soldering. The surface tension of the melted soldering tin helps self-alignment in the horizontal direction. A guiding pin penetrates through the leadframe and the through hole of a lens support for installing a micro lens set to have vertical alignment. The opto-electrical device, the micro lens set, and the optic fiber connector are thus precisely aligned. The leadframe and the through hole on the lens support have alignment and stress relaxation designs to reduce deformation. It can prevent stress from accumulating on the guiding pin and the opto-electrical device due to thermal expansion. The invention can therefore increase the yield and reliability.

16 Claims, 4 Drawing Sheets

PASSIVE ALIGNMENT PACKAGING STRUCTURE FOR OPTO-ELECTRICAL DEVICES AND OPTIC FIBER CONNECTORS

BACKGROUND OF THE INVENTION

1. Field of Invention

The invention relates to a passive alignment packaging structure and, in particular, to a passive alignment packaging structure for opto-electrical devices and optic fiber connectors.

2. Related Art

With the rapid development of the Internet and to follow the future trend in high-speed broadband communications, there is a higher demand in communication speed and quality. Optical communications using optic fiber networks has become the emphasis in the communication industry. Optic fiber products related to optical communications also become more important. The optical transceiver that emits and receives optical signals is a significant device in optical active devices. High-speed transmission systems using optic fibers as the media require high-quality optical transceivers for support.

As electronics packaging becomes more compact and the optical transmission speed keeps increasing, the packaging of the optical transceiver also becomes smaller. Under the high precision requirement of the coupling efficiency between the laser source and the optic fiber, the alignment is of greater importance. Moreover, the newly developed optical communication device technology utilizes surface-emitting and surface-detecting devices. Such devices include the vertical cavity surface emitting laser (VCSEL) and the PIN photodiode. These make the optical path alignment of the optical transceiver even harder.

Currently, the commonly adopted active alignment is performed manually. It takes a longer time and requires a large amount of manpower. Therefore, this method is not ideal for mass production. In contrast, the passive alignment packaging is more suitable for automatic production at a lower cost. The known passive alignment includes the following methods. In the design of the U.S. Pat. No. 5,905,831, a V-shape groove is formed on a substrate and an opto-electrical device by etching for installing an optic fiber. A square groove is made on the vertical direction of the substrate to accommodate the device. This method allows a passive alignment between the device and the optic fiber. However, the precision of the alignment in this method is determined by the error and precision due to machining. In the U.S. Pat. No. 5,499,312, the chip mounting technology is used to perform passive alignment between the optical waveguide and the opto-electrical device. The optical waveguide, the base, and the opto-electrical device are connected by soldering. The surface tension of the solder ball produces the self-alignment effect. This method is used in edge-emitting laser opto-electrical devices. The alignment requires precision calculation of the solder ball distribution and the granular size in order to achieve the optimized alignment effect.

Moreover, in the U.S. Pat. No. 5,499,312, a guiding pin is used to directly penetrate through the substrate and the lens to form an aligned structure with the optic fiber connector. However, directly making through holes on the substrate and the lens is likely form localized stress. The thermal expansion caused by temperature change can damage the substrate and lens. The yield and reliability are hard to increase.

SUMMARY OF THE INVENTION

In view of the foregoing, an objective of the invention is then to provide a passive alignment packaging for opto-electrical devices and optic fiber connectors. A precision passive alignment packaging structure is employed to satisfy the requirements for a precision optical path. Furthermore, the passive alignment packaging is beneficial for automatic assembly for lowering the manufacturing cost.

Another objective of the invention is to design a precision passive alignment packaging structure from an opto-electrical device to an optic Fiber connector. According to the disclosed technique, the passive alignment packaging structure contains: a base, a leadframe, and a micro lens set. The base surface has two guiding pins. The leadframe is connected to a silicon substrate by soldering. The silicon substrate is further installed with an opto-electrical device. The micro lens set contains a lens support and a set of lenses to focus light. The two guiding pins on the base align and connect the leadframe and the lens support. The leadframe and the lens support have two through holes corresponding to the number and positions of the guiding pins. The guiding pins penetrate through the leadframe and the lens support, directly having the vertical alignment. The soldering between the silicon substrate and the leadframe performs the horizontal alignment. Therefore, the optical path from the opto-electrical device to the optic fiber connector can be precisely aligned.

In addition, the two through holes on the leadframe and the lens support have alignment and stress relaxation designs to reduce deformation caused by guiding pin insertion during the assembly. Errors produced during the through hole manufacturing process can be reduced. The invention also avoids damages on the guiding pins and device caused by localized stress due to thermal expansion. The yield and reliability can be effectively increased.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
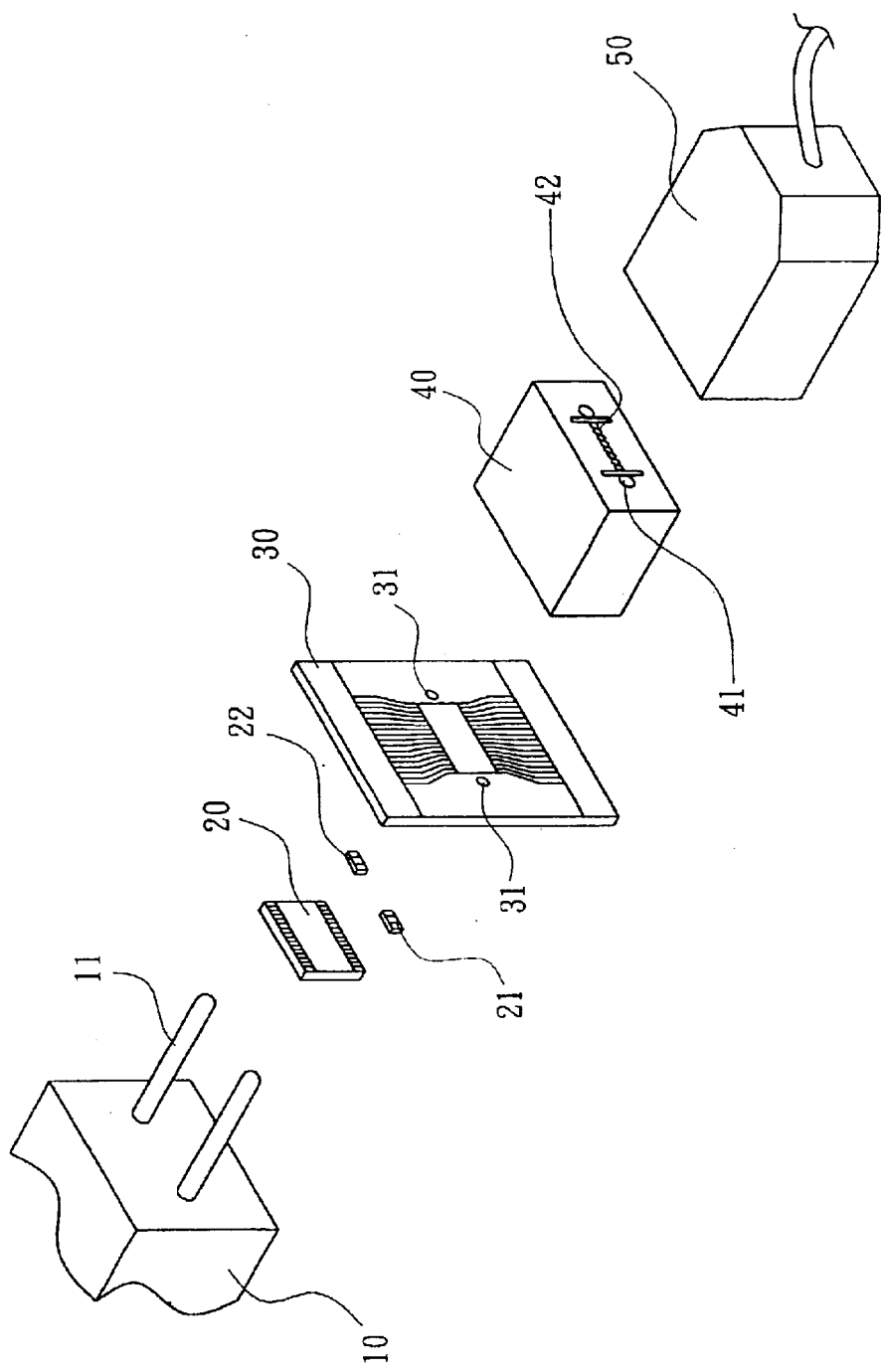
FIG. 1 is an exploded view of the first embodiment of the passive alignment packaging structure for opto-electrical devices and optic fiber connectors according to the invention.

A first embodiment of the invention is shown in FIG. 1. The disclosed passive alignment packaging structure containing opto-electrical devices and an optic fiber connector has: a base 10, a leadframe 30, and a lens support 40. The base has a pair of guiding pins 11 on its surface. The leadframe 30 is connected to a silicon substrate 20 by soldering. The silicon substrate 20 is further installed with a laser diode and a photo detecting diode 22. The leadframe 30 is formed with a pair of through holes 31 corresponding to the positions of the guiding pins 11. The through holes 31 on the leadframe 30 have alignment and stress relaxation designs. The lens support 40 contains a micro lens set 42, which may be comprised of one or many lenses, for providing a converging optical path. The lens support 40 also has a pair of through holes 41 corresponding to the guiding pins 11. The through holes 41 on the lens support 40 have alignment and stress relaxation designs. The guiding pins 11 on the base 10 penetrate through the through holes 31 on the leadframe 30 and the through holes 41 on the lens support 40, aligning in order the leadframe 30 and the lens support 40 to an optic fiber connector 50.

The lens support 40 of the invention contains a separator structure, which adjusts the interval among the several opto-electrical devices and the micro lens set to form an appropriate optical path. The base 10 can be a thermal sink. The leadframe 30 is used to provide electrical signal transmissions. Since the silicon substrate is connected with the leadframe 30 by soldering, the self-alignment property of soldering tin can provide horizontal alignment to bring the silicon substrate 20 the correct position.

In addition, the guiding pins 11 of the base 10 provide the alignment function so that the opto-electrical devices (the laser diode 21 and the photo detector diode 22) installed on the leadframe 30 and the micro lens set 42 form a vertically aligned structure. Therefore, each of the leadframe 30 and the lens support 40 require a pair of through holes 31, 41 for the guiding pins to penetrate through. The through holes 31, 41 have alignment and stress relaxation designs to reduce possible deformation caused by the guiding pin insertion during assembly. This can reduce the influence of errors generated during the through hole manufacturing process. It also avoids damages on the guiding pins and devices caused by localized stress due to the thermal expansion effect. The yield and reliability can be effectively increased. The embodiment provides the design of a pair of guiding pins and through holes for a precision alignment among the leadframe 30, the lens support 40, and the optic fiber connector. However, the invention is not limited to only one pair of guiding pins and through holes.

Figure 2:
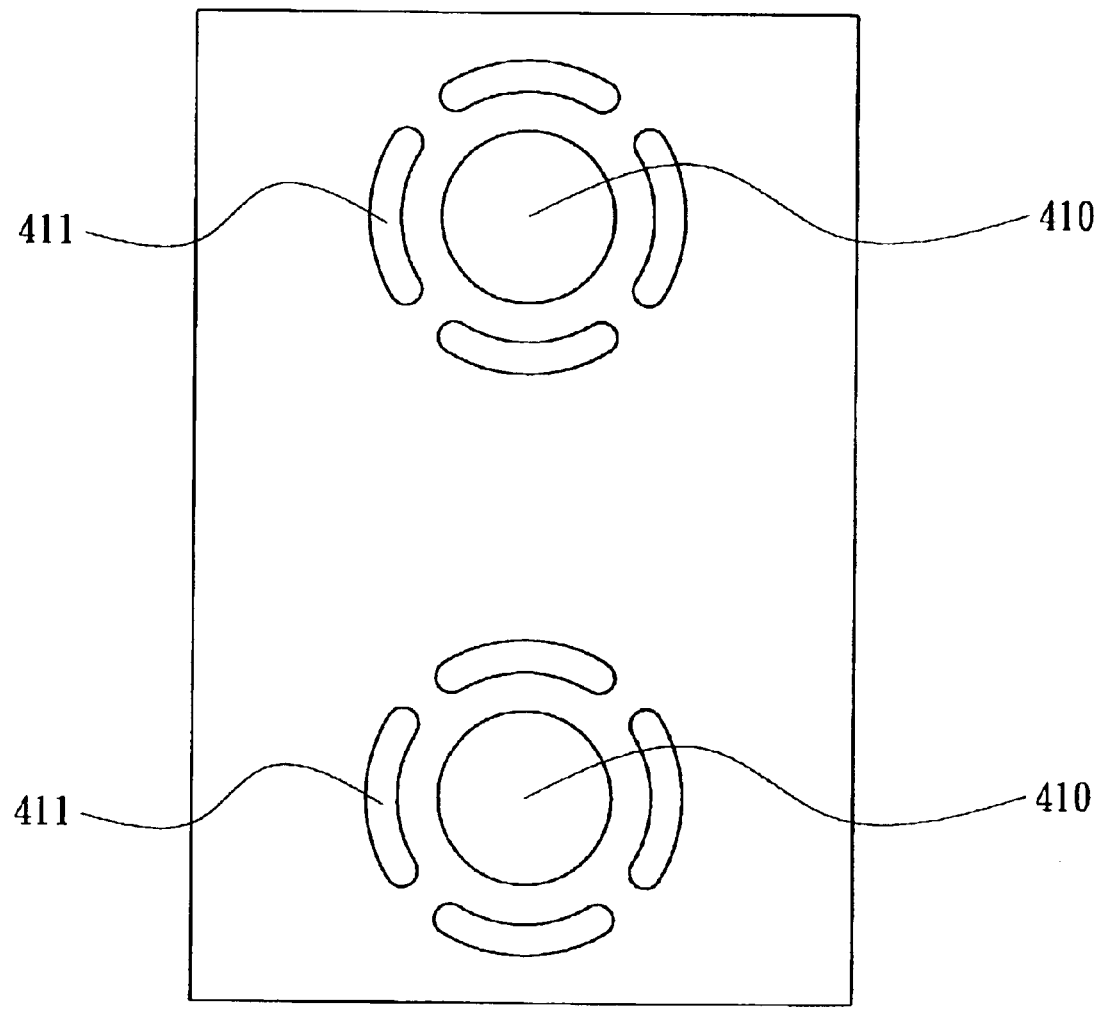
FIG. 2 is a schematic view of an alignment and stress relaxation design with annular through arc-shape holes.
Figure 3:
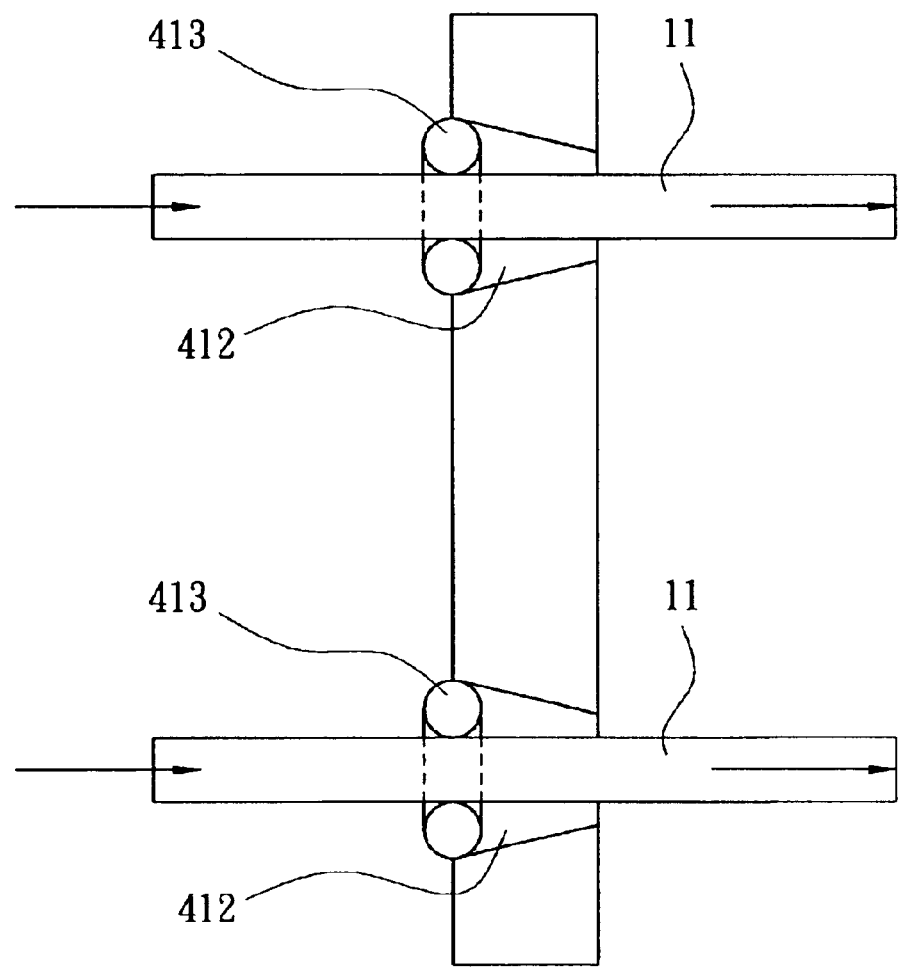
FIG. 3 is a schematic view of an alignment and stress relaxation design with a tight combination.

The design of alignment and stress relaxation on the through holes has many different forms. An annular design is shown in FIG. 2. The rim of each through hole 410 is formed with a plurality of surrounding arc-shape holes 411, which can distribute stress to avoid localized stress and increase the tolerance on the errors of through hole manufacturing. Moreover, FIG. 3 shows a design of a tight combination of guiding pins and through holes. The alignment and stress relaxation design of the through holes is to have a conic through hole 412 in combination with an annular elastic object 413 corresponding to the larger opening of the through hole. The guiding pin 11 goes through the conic through hole 412. The annular elastic object 413 avoids localized stress so that the guiding pin 11 is maintained at a fixed position.

Figure 4:
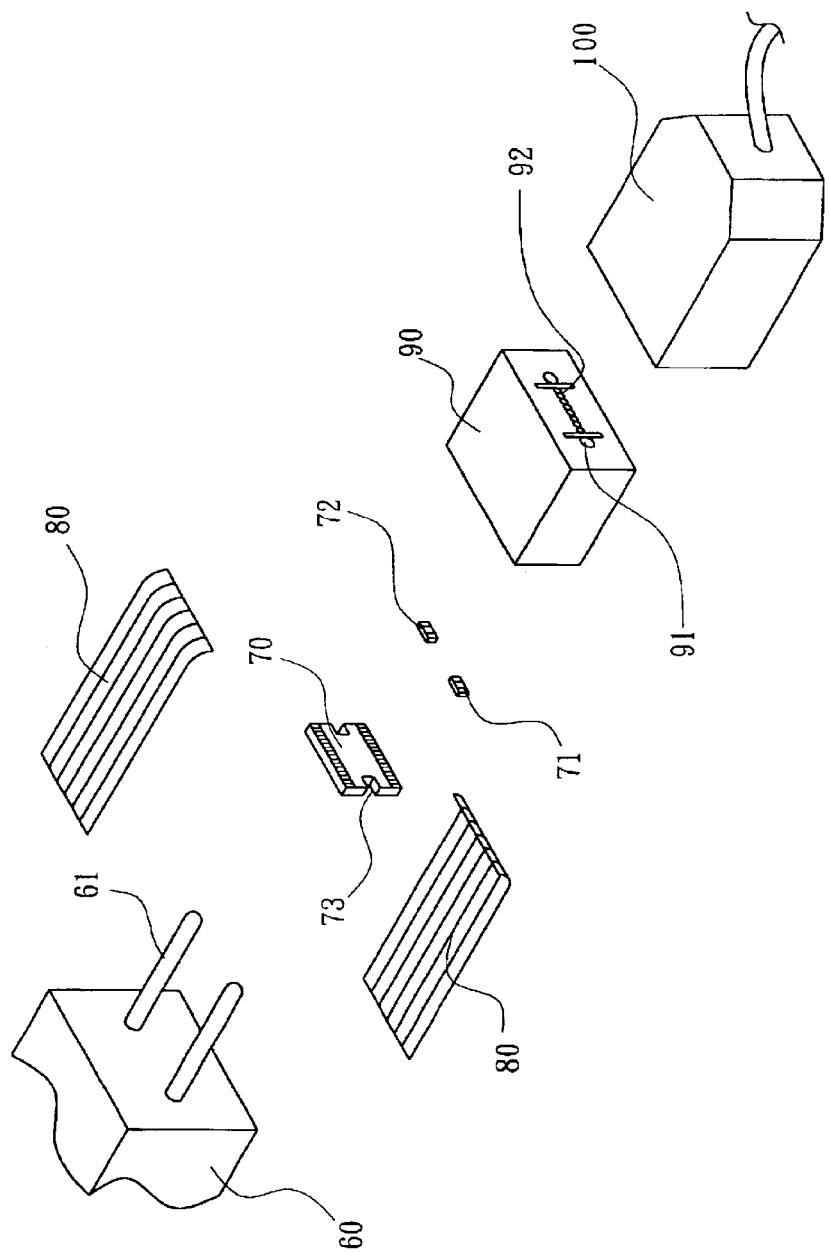
FIG. 4 is an exploded view a second embodiment of the invention.

Another embodiment of the invention is shown in FIG. 4. The passive alignment packaging structure contains: a base 60, a silicon substrate 70, a soft circuit board 80, and a lens support 90. The surface of the base 60 is provided with a pair of guiding pins 61. The silicon substrate 70 is installed with a laser diode 71 and a photo detecting diode 72. The silicon substrate 70 is further formed with a pair of grooves 73 at positions corresponding to the guiding pins 61. The soft circuit board 80 is connected to the silicon substrate 70 by soldering for electrical signal transmissions. The lens support contains a micro lens set 92 for providing a converging optical path. The micro lens set 92 may be comprised of one or multiple micro lenses. The lens support 90 is also formed with a pair of through holes 91 at positions corresponding to the guiding pins 61 on the base 60. The through holes 91 also have the alignment and stress relaxation design.

The second embodiment of the invention uses the pair of guiding pins 61 on the base 60 to penetrate through the grooves 73 of the silicon substrate 70 and the through holes of the lens support 90, aligning the silicon substrate 70 and the lens support 90 in order before connecting to the optic fiber connector 100. The difference between the second embodiment and the first one is that the guiding pins are directly used to fix the silicon substrate without the use of a leadframe. The soft circuit board then provides electrical communications on the silicon substrate. The through holes 91 of the lens support 90 also have the alignment and stress relaxation design (as in FIG. 2 or 3). As described before, the invention is not limited to only one pair of guiding pins and through holes. More pins and through holes can be utilized if necessary.

Certain variations would be apparent to those skilled in the art, which variations are considered within the spirit and scope of the claimed invention.

What is claimed is:

1. A passive alignment packaging structure for opto-electrical devices and optic fiber connectors, comprising:
    a leadframe, which is formed with a plurality of first through holes with an alignment and stress relaxation design;
    a silicon substrate, which has a plurality of opto-electric devices formed on its surface and is connected to the surface of the leadframe by soldering;
    a lens support, which has a micro lens set for providing the opto-electrical devices a converging optical path and is formed with a plurality of second through holes with an alignment and stress relaxation design; and
    a base, which is provided with a plurality of guiding pins on its surface for penetrating through the plurality of first through holes of the leadframe and the plurality of through holes of the lens support, combining in order the leadframe and the lens support to form an aligned structure.

2. The passive alignment packaging structure of claim 1, wherein the alignment and stress relaxation design is to form a plurality of surrounding annular holes around each of the through holes.

3. The passive alignment packaging structure of claim 1, wherein the alignment and stress relaxation design is to form a conic through hole structure for each of the through holes and to provide an annular elastic object in accord with the larger opening of the conic through hole.

4. The passive alignment packaging structure of claim 1, wherein the lens support further contains an interval structure to generate an appropriate optical path distance among the opto-electrical devices and the micro lens set.

5. The passive alignment packaging structure of claim 1, wherein the micro lens set is selected from the group consisting of a micro lens and a plurality of arrayed micro lenses.

6. The passive alignment packaging structure of claim 1, wherein the base is a heat sink.

7. The passive alignment packaging structure of claim 1, wherein the plurality of opto-electrical devices contains at least one laser diode and at least one photo detector.

8. The passive alignment packaging structure of claim 1, wherein the leadframe provides the function of electrical signal transmissions.

9. A passive alignment packaging structure for opto-electrical devices and optic fiber connectors, comprising:
    a silicon substrate, which is formed with a plurality of opto-electric devices and a plurality of groves on its surface;
    a lens support, which has a micro lens set for providing the opto-electrical devices a converging optical path and is formed with a plurality of through holes with an alignment and stress relaxation design; and a base, which is provided with a plurality of parallel guiding pins on its surface for penetrating through the plurality of grooves of the silicon substrate and the plurality of through holes of the lens support, combining in order the silicon substrate and the lens support to form an aligned structure.

10. The passive alignment packaging structure of claim 9, wherein the alignment and stress relaxation design is to form a plurality of surrounding annular holes around each of the through holes.

11. The passive alignment packaging structure of claim 9, wherein the alignment and stress relaxation design is to form a conic through hole structure for each of the through holes and to provide an annular elastic object in accord with the larger opening of the conic through hole.

12. The passive alignment packaging structure of claim 9, wherein the lens support further contains an interval structure to generate an appropriate optical path distance among the opto-electrical devices and the micro lens set.

13. The passive alignment packaging structure of claim 9, wherein the micro lens set is selected from the group consisting of a micro lens and a plurality of arrayed micro lenses.

14. The passive alignment packaging structure of claim 9, wherein the base is a heat sink.

15. The passive alignment packaging structure of claim 9, wherein the plurality of opto-electrical devices contains at least one laser diode and at least one photo detector.

16. The passive alignment packaging structure of claim 9, wherein the leadframe provides the function of electrical signal transmissions.

* * * * *